J. C. KENDRICK.
RAKE.
APPLICATION FILED FEB. 20, 1912.
1,066,283. Patented July 1, 1913.
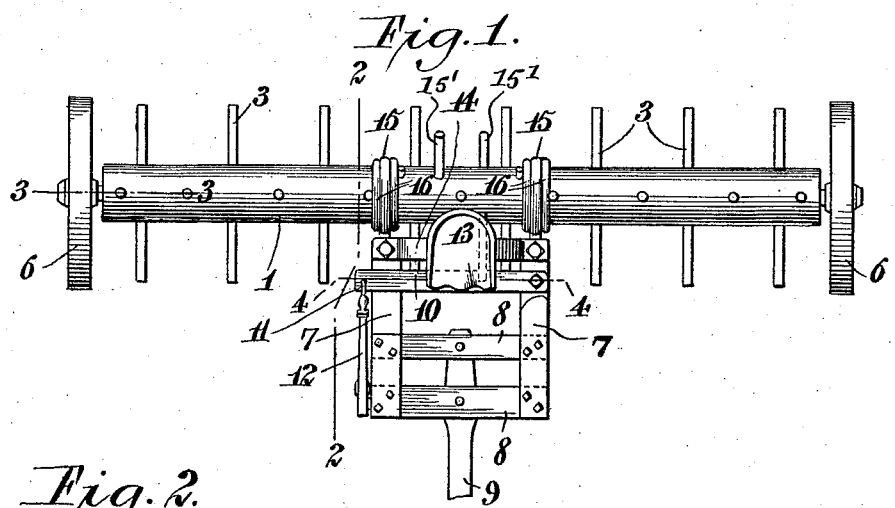
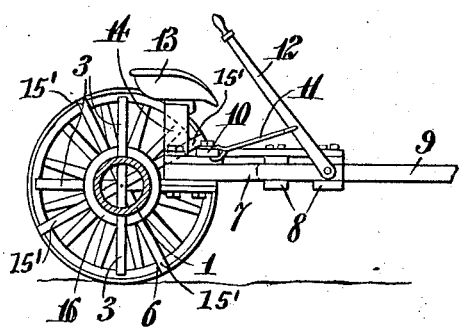
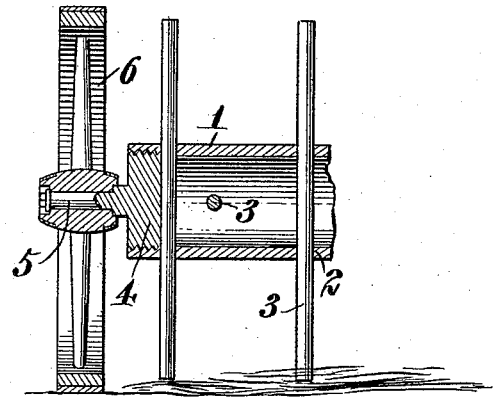
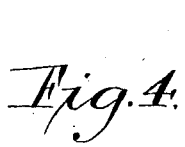
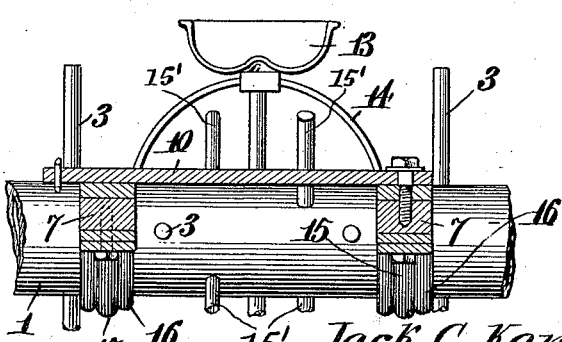
Witnesses:
Christ Feinle, Jr.
Inventor,
Jack C. Kendrick.
By Victor J. Evans,
Attorney.
COLUMBIA PLANOGRAPH CO., WASHINGTON, D. C.

UNITED STATES PATENT OFFICE.

JACK C. KENDRICK, OF FORT SMITH, ARKANSAS.

RAKE.

1,066,283. Specification of Letters Patent. Patented July 1, 1913.

Application filed February 20, 1912. Serial No. 678,806.

*To all whom it may concern:*

Be it known that I, JACK C. KENDRICK, a citizen of the United States, residing at Fort Smith, in the county of Sebastian and State of Arkansas, have invented new and useful Improvements in Rakes, of which the following is a specification.

This invention relates to farming implements, and it has particular reference to a rotary rake.

The invention has for its object to produce a rotary rake embodying a wheel supported member mounted for rotation and having radially extending teeth or fingers adapted to be dragged over the surface of the ground to gather the hay, means being provided for temporarily preventing the tooth carrying member from rotating.

A further object of the invention is to simplify and improve the construction and operation of a device of the character described.

With these and other ends in view which will readily appear as the nature of the invention is better understood, the same consists in the improved construction and novel arrangement and combination of parts which will be hereinafter fully described and particularly pointed out in the claim.

In the accompanying drawing has been illustrated a simple and preferred form of the invention, it being, however, understood that no limitation is necessarily made to the precise structural details therein exhibited, but that changes, alterations and modifications within the scope of the claim may be resorted to when desired.

In the drawing,—Figure 1 is a top plan view of an implement constructed in accordance with the invention. Fig. 2 is a longitudinal sectional view taken on the line 2—2 in Fig. 1. Fig. 3 is a vertical sectional detail view taken through one end of the rotary member and the supporting wheel on the line 3—3 in Fig. 1. Fig. 4 is a transverse sectional view taken on the line 4—4 in Fig. 1.

Corresponding parts in the several figures are denoted by like characters of reference.

The body of the improved implement consists of an iron pipe 1 of suitable dimensions, said body having a plurality of rows of apertures 2, said rows being disposed in diametrical opposite relation, and the perforations of alternate rows being disposed in staggered relation and as close together as may be desired. The member 1 is provided with radially extending teeth consisting of rods 3 of suitable length which are driven through diametrical opposite perforations and projecting radially on opposite sides, alternate teeth being disposed substantially at right angles to each other, as shown. The ends of the pipe or tubular member 1 are provided with plugs 4 which may be threaded into the ends of the tubular member or otherwise securely connected therewith, said plugs being provided with spindles 5 on which the transporting wheels 6 are supported for rotation, said wheels being of such dimensions with reference to the radially extending teeth that the latter will normally clear the ground by a small margin.

A frame structure is provided which is composed of side members 7 which are connected together and spaced apart by cross bars 8, some of which serve to support a tongue 9. Pivoted upon one of the side bars 7 is one end of a brake bar 10, the other end of which is firmly supported on the other side bar 7 and is connected by a link 11 with an operating lever 12 which is fulcrumed on the frame in such a position as to be conveniently accessible to the driver or operator whose seat 13 is supported on a resilient arch 14 which is supported on the side members 7 of the frame. By this mechanism the brake bar may be moved into or out of the path of the special teeth or engaging members 15' which extend through the tubular head or member 1 at an angle of approximately 30 degrees to the rake teeth 3, said special teeth 15' being so positioned that when in engagement with the brake bar, the rotation of the rake head will be arrested in such a position that some of the teeth 3 will be in an approximately vertical position for operation, while others of said teeth will be in an approximately horizontal position. The side members 7 are provided with rearwardly extending eyes 15 constituting bearings for the rotary tubular member 1. Set collars 16 are mounted upon the member 1 adjacent to the eyes 15 for the purpose of preventing displacement of the rotary member with reference to the eyes or bearings.

From the foregoing description, taken in connection with the drawing hereto annexed, the operation of this invention will be readily understood by those skilled in the art to which it appertains. When the device is in operation, the brake bar 10 is moved to a position where it will lie in the path of some of the special teeth 15', thereby preventing the tubular member 1 from rotating and causing such of the teeth 3 as extend downwardly to gather the hay from the field over which the implement is drawn. To discharge the accumulated hay, the lever 12 is manipulated to move the bar 10 temporarily to a non-obstructing position, thus permitting the rotary member to make part of a revolution and causing the accumulated material to be disengaged and left behind, the bar 10 being immediately restored to an obstructing position.

When the machine is to be transported from one place to another the bar 10 is maintained in an obstructing position, and the machine will then travel upon the transporting wheels 6; should any obstructions be encountered, the toothed member 1 will rotate freely and pass such obstructions.

Having thus described the invention, what is claimed as new, is:—

In a device of the character described, a tubular member having four rows of perforations ninety degrees apart, said rows extending lengthwise with relation to the tube and the corresponding perforations of opposite rows being diametrically opposite, the operations of the alternate rows being disposed in staggered relation, and rods engaging said perforations to form radially extending teeth, which extend far enough through the perforations to come in close proximity to the ground when in depending position removable plugs at the ends of the tubular member and having outwardly extending spindles, transporting wheels on said spindles, a frame having side members provided with rearwardly extending eyes constituting bearings engaging the tubular member, set collars on said tubular member adjacent to the bearings, additional teeth extending diametrically through the tubular member at an angle of approximately forty-five degrees to the first mentioned teeth and of a length exceeding the length of said teeth, a bar pivoted on one side member of the frame and having a free end firmly supported on the opposite side member and adapted to lie in an obstructing position with reference to the special long teeth, and means for moving the free end of said bar along the side bar whereon it rests, thereby moving the body portion of said bar to and from an obstructing position.

In testimony whereof I affix my signature in presence of two witnesses.

JACK C. KENDRICK.

Witnesses:
T. B. CARNALL,
PEARL HICKS.

---

Copies of this patent may be obtained for five cents each, by addressing the "Commissioner of Patents, Washington, D. C."